United States Patent [19]
Millward
[11] 3,885,092
[45] May 20, 1975

[54] CINEMATOGRAPHIC FILM PROJECTOR

[75] Inventor: John David Millward, Hitchin, England
[73] Assignee: Decca Limited, London, England

[22] Filed: Apr. 5, 1973
[21] Appl. No.: 348,205

[30] Foreign Application Priority Data
Apr. 28, 1972 United Kingdom .............. 19932/72

[52] U.S. Cl. .......................... 178/7.2; 178/DIG. 24
[51] Int. Cl. ............................................ H04n 5/38
[58] Field of Search ......... 178/DIG. 28, 7.2, 69.5 F, 178/6.7 A, DIG. 24; 360/35-37, 3, 9; 358/11; 352/138

[56] References Cited
UNITED STATES PATENTS
2,834,832 5/1958 Somers ............................... 178/7.2
3,366,733 1/1968 Frohbach .................... 178/DIG. 28
FOREIGN PATENTS OR APPLICATIONS
1,289,979 9/1972 United Kingdom

*Primary Examiner*—Howard W. Britton
*Assistant Examiner*—R. John Goderey
*Attorney, Agent, or Firm*—Edward F. Connors

[57] ABSTRACT
A system for converting cinematographic film pictures to television signals, comprising a film projector including an intermittently operable film traversing mechanism, a television camera, a source of field synchronising pulses for the television camera, and an actuating device for operating the film traversing mechanism in response to some of the pulses. A logic circuit is provided for selecting different cyclic sets of the pulses for operating the mechanism in accordance with the particular television system being used.

1 Claim, 3 Drawing Figures

CINEMATOGRAPHIC FILM PROJECTOR

This invention relates to cinematographic film projectors, particularly as used for converting cinematographic pictures to television signals. In such a conversion, a serious problem arises by virtue of the two principle television systems used in the world today.

In the 625 line standard a complete picture is produced in 1/25th of a second. The standard speed for film is 24 frames per second or one picture in 1/24th of a second. The film can be projected slightly faster than normal at 25 frames per second and each film frame can be scanned twice to produce a complete interlaced picture. The increased sound pitch is normally acceptable. In the 525 line standard a complete picture is produced every 1/30th of a second, and running the film projector at 30 frames per second produces an unacceptable acceleration of the movements depicted and an unacceptable increase in audible pitches. Therefore the projector is operated at 24 frames per second and each alternate film frame is scanned twice (i.e. 525 lines) and the remaining alternate film frames are scanned thrice (i.e. 787½ lines). This means that the film dwell time (i.e. the time each film frame is stationary) is different for alternate frames for the 525/60 system whereas for the 625/50 system the dwell time is constant.

There will normally be available, during conversion of the pictures on the film to television signals, field synchronising pulses which are used to control the operation of the television camera associated with the projector, these pulses being incorporated in an output signal which may be braodcast or recorded. The projector itself normally has a geneva mechanism or other intermittent drive for effecting traversal of the film between dwells during each of which a frame of the film is scanned.

According to the invention a system for converting cinematographic film pictures to television signals comprises a film projector with an intermittently operable film traversing mechanism, a television camera, a source of field synchronising pulses for the camera and means for operating the said mechanism in response to some of the pulses, means being provided to select different cyclic sets of the pulses for operating the mechanism.

The selection of the pulses facilitates conversion to different television standards as desired, for example, either alternate field pulses may be selected or the second and fifth pulses in each succession of five pulses can be selected according as the required television standard is 625 lines or 525 lines.

Reference will hereinafter be made to the accompanying drawings of which:

In the embodiment to be described the projector has a sprocket for engaging sprocket holes in a film. The sprocket is driven by a geneva star and pinwheel and in this example an eight position geneva, which requires a pinwheel rotation of 135° for pull down, is used.

Figure 1:
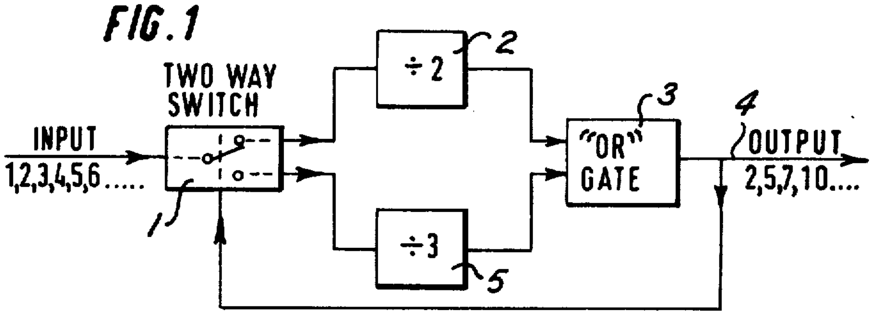
FIG. 1 is a schematic diagram of a field pulse selector circuit for use in a system embodying the invention.

The projector principally operates by rotating the pin wheel 360°. The speed of the projector is equivalent to a slow motion version of the standard 625/50 or 525/60 T.V. systems. If one is operating at 1 frame per second on a reduced speed 625/50 system, then alternate field pulses from the slow speed sync generator will be used to initiate one revolution of the pin wheel. On a reduced speed 525/60 system the pin wheel would be driven by field pulses selected as in the following sequence 2, 5, 7, 10, 12, 15, 17 etc. This can be provided by the circuit shown in FIG. 1. Incoming field pulses (2 per second for 1 frame per second) will first be routed by a two way switch 1 to a divide by two counter 2; the second pulse will provide via an OR gate 3 an output on a line 4. The output will also operate the two way switch 1, diverting the field pulses to a divide by three counter 5 so that the fifth pulse will appear at the output line 4 and also again change the two way switch and so on.

The apparatus of the conversion system includes a film projector 6 and a television camera 7 (see FIG. 2), linked to the film projector by a scanning link 8, for scanning the frames of a film 9. Field synchronizing pulses are fed from a pulse source 10 via a pulse link 11 to the television camera 7 which scans once for each pulse. A two-way switch 12 connects the pulse output from the field synchronising pulse source 10 selectively to a 525 line system pulse selection circuit 13, or to a 625 line pulse selection circuit 14. These two circuits 13 and 14 are connected via a common output line 15 to the film projector 6, to transmit selected ones of the output pulses from the source 10 thereto. The two way switch 12 may be operated to switch in circuit either one of the pulse selection circuits 13 and 14, dependent upon which of the two television systems, 525 line, or 625 line is being used.

The 625 line pulse selection circuit comprises a divide-by-two logic unit to fulfil the functional requirements of this television system, as described above, that is, to transmit one in every two pulses to the film projector. The 525 line pulse selection circuit comprises the circuit shown schematically in FIG. 1, so as to transmit pulse numbers 2, 5, 7, 10, 12 etc to the film projector. Each of the selected and transmitted pulses will cause the film traversing mechanism of the projector to advance the film by one frame. Between successive advancements of the film, the frames are scanned by the television camera in response to the synchronising pulses from the pulse source. The number of times each frame is scanned depends upon which of the two sequence of pulses as explained above, is selected by the two way switch 12.

Figures 2, 3:
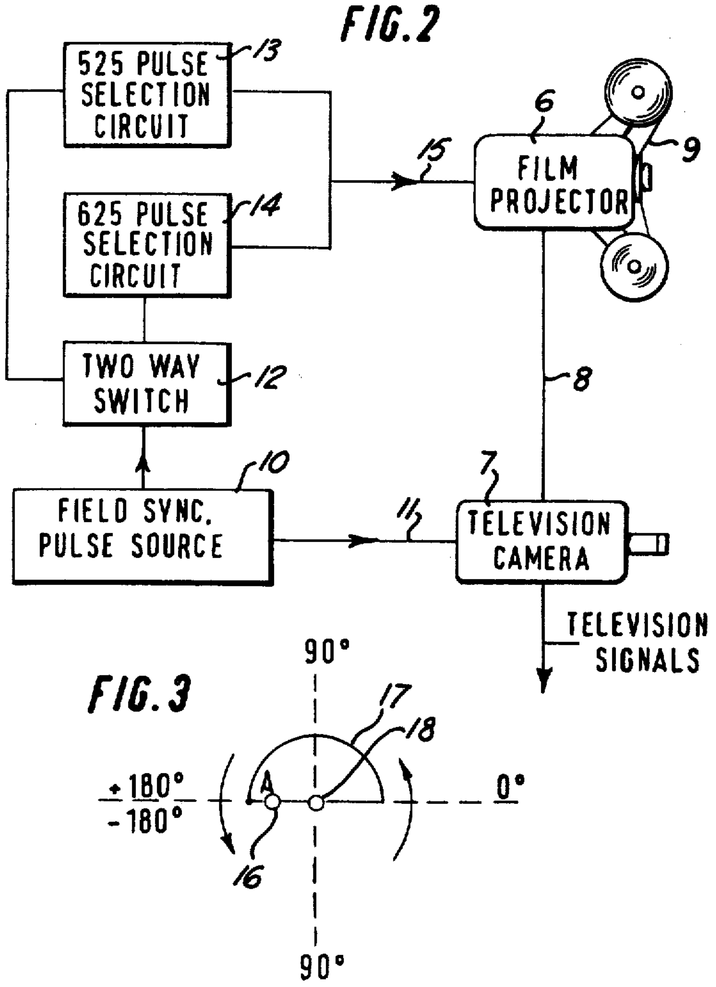
FIG. 2 is an explanatory diagram.
FIG. 3 is a schematic diagram of a conversion system in accordance with the present invention.

It should be mentioned that the concept of producing television signals from a cinematographic film, and therefore the apparatus consisting only of the film projector 6 and the television camera 7 of the system shown in FIG. 3, is in itself well known.

Having selected the required field pulses, a motor for the film traversing sprocket must be driven in such a manner that an accumulating phase error is avoided. The method by which this desired state is attained is as follows:

The drive conditions of the motor will have three distinct states, which will be called the "driving" state the "hold" and the "stop" state. These states are determined by a logic circuit and a photocell and lamp arrangement 16 which cooperates with a semicircular plate 17 mounted on the motor's drive shaft 18. Referring to FIG. 3, in the stop state when the photocell is 'dark' (masked from the lamp by the plate) the drive motor will be in a slow reverse mode and when the photocell is 'light' (unmasked) the motor will be in a slow forward mode. The motor will position itself so that the plate and cell are as shown in the diagram. Point A will be at − 180° and the centre of pull-down of the film is when A is at 0°.

When the projector is in operation only two states are applicable, that is "driving" and hold. Immediately after a forward command the state changes to hold. In this condition the 'photocell dark' state is associated with 'reverse torque' and the 'photocell light' state is associated with 'stall'. The stall condition means that the rotor of the motor is short circuited. Therefore, in the hold condition, the phase of the photocell disc remains the same. The first field pulse that passes through the circuit described earlier switches the logic circuit to the third state which is driving. In this state, full forward torque is applied by the motor and after the first dark to light transition the logic circuit reverts to the hold state. Therefore the motor, shaft and pin wheel accelerate with maximum torque until the centre of pull down is reached, after which the assembly is braked. If the full reverse torque had been applied one would expect the shaft to stop again at − 180°. Owing to variation in friction and oil damping the final stopping point would be unreliable. By applying a stall torque which will be smaller than the full reverse torque to the motor it will be made to overshoot the − 180° point and then receive reverse torque and at the 180° point change back to the stalled state. By controlling the reverse torque in the hold state the pin wheel can be repositioned ready for the next field pulse when the cycle repeats.

It can be shown that the driving state will be approximately 16ms and the minimum hold state will be in the region of 400ms or more, therefore plenty of time is available to reposition the pin wheel.

When it is required to run the film at 24 or 25 frames per second instead of the operating speed of 1 or 2 frames per second, the motor can be driven continuously and the pull down will then be slower than in the slow motion mode; this is an advantage because a coherent T.V. signal is not required in this fast mode.

Preferably the motor is rated to operate when stalled, having a high initial acceleration. Such a motor, usually without ferromagnetic substances in its rotor is often called a 'torque motor'.

I claim:

1. A system for deriving signals for reproducing video information from cinematographic film in television systems, comprising: a film projector including an intermittently operable film traversing mechanism; a television camera; a source of regular field synchronizing pulses for the television camera; means for operating the film traversing mechanism in response to some of the pulses; two pulse selection circuits for passing some of said field synchronizing pulses to the operating means; a selectively operable two-way switch having two alternative outputs; a first one of said pulse selection circuits comprising a first divide-by-two logic unit, whose input is connected to one of the two alternative outputs of the two-way switch, thereby to pass to said operating means every alternate field synchronizing pulse, whereby each film frame is scanned twice; the other pulse selection circuit comprising a second two-way switch which has an input connected to the other of the said two alternative outputs of the first two-way switch, and two outputs, one of said outputs being connected to an input of a divide-by-three logic unit for producing an output pulse in response to three pulses from the second two-way switch, the other of said outputs being connected to the input of a second divide-by-two logic unit for producing an output pulse in response to two pulses from the second two-way switch, an "OR" gate having two inputs, each input being connected to an output of one of the logic units, and a switch actuating device responsive to each pulse at the output of the "OR" gate for switching the input of the second two-way switch from one to the other of its outputs thereby to pass to said operating means selected field synchronizing pulses, the selected pulses being separated alternately by one and two non-selected pulses, whereby alternate film frames are scanned twice and three times, the outputs of the "OR" gate and of the first divide-by-two logic unit being connected to the operating means; said selectively operable first two-way switch being operative for selectively switching the field pulses to one or other of said pulse selection circuits.

* * * * *